US008883071B2

(12) United States Patent
Reeves (10) Patent No.: US 8,883,071 B2
(45) Date of Patent: Nov. 11, 2014

(54) MOLTEN METAL CONTAINMENT STRUCTURE HAVING MOVABLE COVER

(75) Inventor: Eric W. Reeves, Hayden Lake, ID (US)

(73) Assignee: Novelis Inc., Atlanta, GA (US)

( * ) Notice: Subject to any disclaimer, the term of this patent is extended or adjusted under 35 U.S.C. 154(b) by 175 days.

(21) Appl. No.: 12/930,561

(22) Filed: Jan. 11, 2011

(65) Prior Publication Data

US 2011/0168707 A1 Jul. 14, 2011

Related U.S. Application Data

(60) Provisional application No. 61/335,986, filed on Jan. 13, 2010.

(51) Int. Cl.
| | |
|---|---|
| *B65D 55/00* | (2006.01) |
| *B22D 41/01* | (2006.01) |
| *B22D 41/00* | (2006.01) |

(52) U.S. Cl.
CPC ............... *B22D 41/01* (2013.01); *B22D 41/00* (2013.01)
USPC ............................ 266/236; 220/211; 222/597

(58) Field of Classification Search
CPC ................................ B22D 41/01; B22D 41/00
USPC .......... 266/236, 196, 271, 272; 220/211, 212, 220/260, 259.3, 840, 839, 345.1, 345.2, 220/345.3, 348, 350; 432/250, 195; 222/594, 598, 597, 601, 602
See application file for complete search history.

(56) References Cited

U.S. PATENT DOCUMENTS 4,531,717 A * 7/1985 Hebrant ........................ 266/166
5,673,902 A 10/1997 Aubrey et al.
(Continued)

FOREIGN PATENT DOCUMENTS

| GB | 190935 | 1/1923 |
|---|---|---|
| GB | 1909935 A | 1/1923 |

(Continued)

OTHER PUBLICATIONS

Canadian Intellectual Property Office, International Search Report, Apr. 15, 2011, PCT/CA2011/000018 (Novelis Inc., et al.).

(Continued)

*Primary Examiner* — Scott Kastler
*Assistant Examiner* — Michael Aboagye
(74) *Attorney, Agent, or Firm* — Kilpatrick Townsend & Stockton LLP (57) ABSTRACT

An exemplary embodiment of the invention provides a molten metal containment structure, including a vessel having an internal volume for containing molten metal and an open upper end. The structure further includes a cover for the vessel having an underside facing the internal volume, the cover being movable between a closed position, covering the open upper end of the vessel with the underside of the cover, and an open position in which the cover is remote from the open upper end of the vessel to allow access to the internal volume from one side of the structure. The cover is attached to at least one lifting arm (preferably two or more) and at least on rotation control arm (preferably two or more). The lifting arm(s) operates to guide the cover from the open position to the closed position, and vice versa. The rotation control arm(s) operates to control pivoting of the cover during movement from the closed position to the open position, and vice versa, to prevent exposure of the underside of the cover, which in operation is very hot, to a person positioned adjacent to the structure at the aforesaid one side thereof. The lifting arm(s) and/or rotation control arm(s) provide a force that at least partially counterbalances a weight of the cover.

26 Claims, 6 Drawing Sheets

(56) References Cited

U.S. PATENT DOCUMENTS

| | | | |
|---|---|---|---|
| 5,910,006 A | 6/1999 | Conroy et al. | |
| 7,984,822 B2 * | 7/2011 | Watson et al. | 220/828 |
| 2006/0024633 A1 | 2/2006 | Levin et al. | |
| 2008/0135555 A1 | 6/2008 | Watson et al. | |
| 2008/0230965 A1 * | 9/2008 | Gorza et al. | 266/160 |

FOREIGN PATENT DOCUMENTS

| | | | |
|---|---|---|---|
| WO | WO 95/21273 A1 | 8/1995 | |
| WO | WO 2006/110974 A1 | 10/2006 | |

OTHER PUBLICATIONS

Canada Patent Application No. 2784200 , Office Action dated Sep. 20, 2013, 2 pages.

Chinese Patent Application No. CN201180006007.9, Office Action mailed Nov. 28, 2013, 7 pages.

Chinese Patent Application No. 201180006007.9, Second Office Action mailed Jul. 10, 2014, 18 pages.

* cited by examiner

MOLTEN METAL CONTAINMENT STRUCTURE HAVING MOVABLE COVER

CROSS-REFERENCE TO RELATED APPLICATION

This application claims the priority right of prior U.S. provisional patent application Ser. No. 61/335,986 filed Jan. 13, 2010 by applicants named herein. The entire contents of U.S. application Ser. No. 61/335,986 are specifically incorporated herein by this reference for all purposes.

BACKGROUND OF THE INVENTION

I. Field of the Invention

This invention relates to molten metal containment structures used for conveying, treating or holding molten metals, incorporating refractory or ceramic molten metal containment vessels, such as troughs or crucibles. More particularly, the invention relates to the provision of covers for such structures and vessels.

II. Background Art

Molten metal containment structures, e.g. metal-conveying troughs or launders, are often required during metal treatment or casting operations to convey molten metal from one location, such as a metal melting furnace, to another location, such as a casting mold or casting table. In other operations, such vessels are used for metal treatments, such as metal filtering, metal degassing or metal transportation.

When the vessels contained in such structures are open at the top, it is desirable to provide a cover both to keep heat in and to keep foreign objects and debris out. Sometimes, such a cover is provided with heaters to heat the vessel in advance of molten metal entry, or to maintain the high temperature of the molten metal as it is being treated or conveyed. It is desirable to make such covers removable so that operators may obtain access to the interior of the vessel, e.g. to clean out the vessel, to remove blockages or to assess molten metal height or condition. The covers may be loose, thereby requiring the operator to lift and move the covers manually, or they may be attached to the structure by hinges typically on the side of the vessel most distant from the operator.

A disadvantage of providing such removable or openable covers is that their undersides, i.e. the surfaces facing the molten metal, become very hot in use and operators of the equipment may be exposed to heat radiating from the undersides when the covers are lifted, resulting in discomfort or burns. In operation with molten aluminum alloys, for example, the underside of a cover may have a temperature within the range of 400 to 800° C. when raised. Moreover, a simple hinge may result in crowding of the opening by the cover, even when the cover is fully retracted. Covers of this kind are often made of a metal shell with a refractory lining and may incorporate heaters of one kind or another. As a result, such covers can be quite heavy, so the lifting may be difficult when attempted by hand, and damage may be caused (particularly to integral heaters) if the covers are simply allowed to fall back into place.

An example of a known metal-conveying trough provided with a cover is disclosed in U.S. Pat. No. 4,531,717 which issued to Georges Hebrant on Jul. 30, 1985. The elongated trough is provided with a number of covers attached to the trough by hinges. The covers are provided with heating means to pre-heat the trough. The force required to open the covers is somewhat reduced by springs which tend to urge the cover to the open (raised) position. However, the operator is exposed directly to the hot underside of the cover when the cover is raised.

Another example of a known device is disclosed in U.S. patent publication 2008/0230965 A1, which was published on Sep. 25, 2008 naming Robert Gorza, et al., as inventors. This publication discloses a floor-mounted handling device, which is a kind of small crane, for removing covers from metal conveying troughs and runners. The device can handle covers of virtually any weight and avoids exposing operators to hot environments. However, the apparatus is costly and requires clear floor space around the troughs or runners.

There is a need for additional approaches for addressing some or all of the problems mentioned above.

SUMMARY OF THE EXEMPLARY EMBODIMENTS

An exemplary embodiment of the invention provides a molten metal containment structure, including a vessel, preferably provided with an outer metal casing, having an internal volume for containing molten metal and an open upper end. The structure further includes a cover for the vessel having an underside facing the internal volume, the cover being movable between a closed position, covering the open upper end of the vessel with the underside of the cover, and an open position in which said cover is remote from the open upper end of the vessel to allow access to the internal volume from one side of the structure. The cover is attached to a support by at least one elongated lifting arm (preferably two or more) and at least one elongated rotation control arm (preferably two or more). The lifting arm operates to guide the cover from the closed position to the open position, and vice versa, and the rotation control arm operates to control horizontal axial pivoting of the cover during movement from the closed position to the open position, and vice versa, to prevent exposure of the underside of the cover, which in operation becomes very hot, to a person positioned adjacent to the structure at the aforesaid one side thereof. Either the lifting arm(s) and/or the rotation control arm(s) provide a force that at least partially counterbalances a weight of the cover. The counterbalancing weight is most preferably provided by the lifting arm(s).

The elongated arms are preferably pivotally attached at one end to the cover and at an opposite end to a solid support, which may be part of the structure (e.g. a sidewall of the metal casing opposite to the side at which the operator stands), or another item, e.g. an adjacent wall or piece of machinery.

The rotation control arm(s) preferably prevents the cover from rotating at the underside from a horizontal position by more than 25° towards the one side of the structure where the operator stands. More preferably, the underside of the cover is kept horizontal or is rotated in a direction away from the operator side of the structure.

The vessel is preferably a metal-conveying trough made of a refractory material suitable for conveying molten metals, the trough having a channel for molten metal extending from one longitudinal end of the structure to the other. The cover preferably has a metal shell and an interior layer of insulating refractory material. However, the vessel may be any other kind of vessel for holding, treating or conveying molten metal having an open top that may be closed by a cover.

The sets of arms are preferably such that:

1) The cover is lifted completely off the open end of the vessel;

2) The cover is moved away from the open upper end of the vessel to expose the entire open upper end;

3) The hot underside of the cover is maintained in an orientation that does not expose the operator to its radiant heat; and 4) The counterbalancing force provides assistance to the operator in moving the trough in an opening direction and preferably also a closing direction.

Most preferably, the arms and the counterbalancing force are such that the cover remains securely in both the closed and the open positions when moved between the two. The counterbalancing force may be provided by a counterweight or by springs or other means. The arms are preferably shaped to avoid contact with the cover during movement of the cover from the closed position to the open position, and vice versa (e.g. they may be C-shaped adjacent to the cover). Preferably, the lifting arm(s) is attached to said vessel via a pivot having a center in a vertical plane such that the cover and parts of the arms directly attached to the cover have a center of gravity that is positioned on one side of the vertical plane when in the closed position and the other side of said plane when in the open position.

Most preferably, the lifting arm(s) is pivotally attached to the vessel at a vertical height below the vertical height of the open upper end of the vessel so that the cover moves in a flat arc between the open and closed positions.

The underside of the cover may be provided with a heater for heating the internal volume when the cover is in the closed position, or alternatively, there may be no such heater and the underside may be provided simply with a layer of refractory insulating material facing the internal volume of the structure.

When the structure has at least two lifting arms and at least two rotation control arms, they are preferably the same in number, and each lifting arm is preferably positioned immediately adjacent to a rotation control arm, and vice versa, so that the arms provide mutual physical support in the lateral direction during movement of the cover.

The cover is preferably provided with a manually graspable region, such as a handle, adjacent to the one side to facilitate opening and closing of the cover. Alternatively, a powered device, such as a hydraulic, pneumatic or electrical motor, may be provided so that the cover can be moved without direct contact from the human operator. Such a device would preferably be provided with a control, either wired or wireless, and such a control may be located on the structure (preferably at the one side thereof) or elsewhere.

The vessel of the structure is preferably made of a refractory material that is resistant to attack by molten metal, e.g. a refractory ceramic material.

BRIEF DESCRIPTION OF THE DRAWINGS

Exemplary embodiments of the invention are described in more detail below with reference to the accompanying drawings, in which.

DETAILED DESCRIPTION

FIGS. 1 through 4 of the accompanying drawings illustrate one exemplary embodiment of the invention. These drawings show a molten metal (e.g. aluminum) containment structure 10 in the form of a molten-metal conveying trough structure (metal transfer trough), sometimes referred to as a launder or metal runner, for conveying molten metal from an entrance at one end of the structure to an exit at the opposite end. The illustrated structure 10 includes a metal-conveying trough 12 provided with channel 14 creating an internal volume for containing and conveying molten metal from one side of the structure to the other. The trough 12, which may be composed of one or more trough sections joined end-to-end, may be made of a suitable molten metal-resistant refractory material, e.g. oxides of aluminum (e.g. alumina), silica (silica, particularly fused silica), magnesium (magnesia), calcium (lime), zirconium (zirconia), boron (boron oxide); metal carbides, borides, nitrides, silicides, such as silicon carbide, particularly nitride-bonded silicon carbide ($SiC/Si_3N_4$), boron carbide, boron nitride; aluminosilicates, e.g. calcium aluminum silicate; composite materials (e.g. composites of oxides and non-oxides); glasses, including machinable glasses; mineral wools of fibers or mixtures thereof; carbon or graphite; and the like. In operation, such a structure would be attached at one end to a source of molten metal, such as a launder from a metal melting furnace, and at the other end to a remote user of the molten metal, e.g. a casting table or casting mold. The structure may be made in any suitable length depending on the distance to be spanned.

Figure 1:
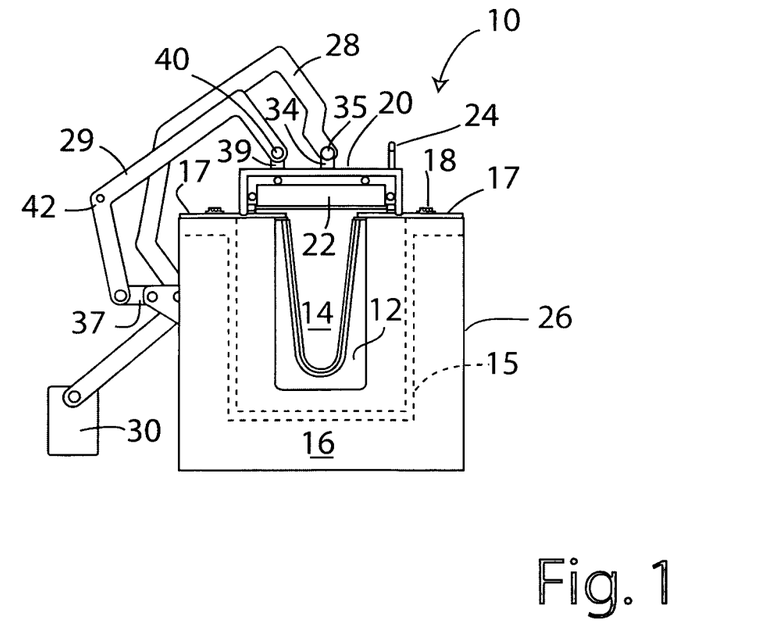
FIG. 1 is an end view of a molten metal trough structure according to one exemplary embodiment of the invention provided with a cover in the fully closed position.
Figure 2:
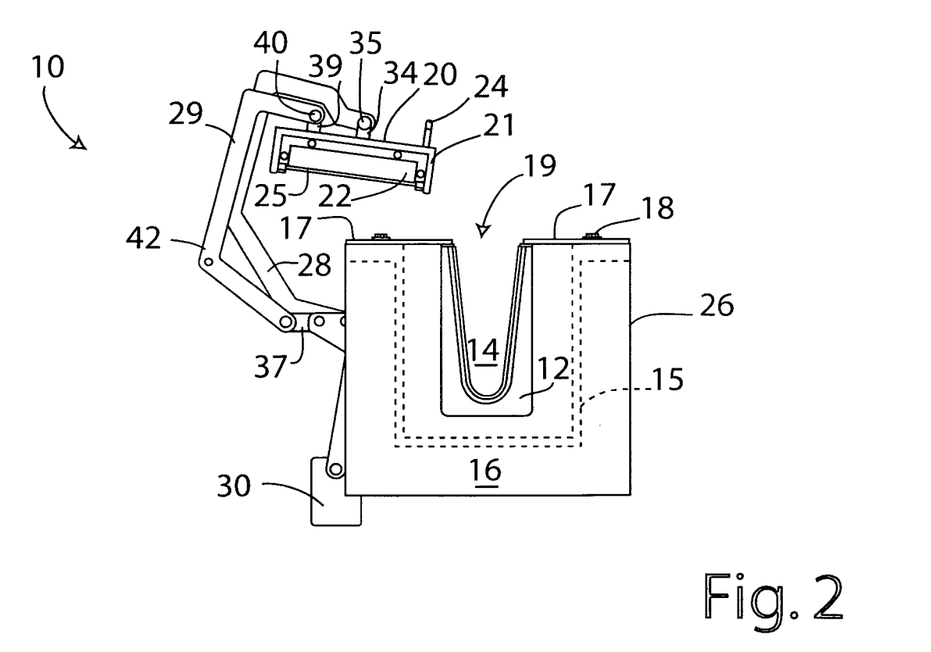
FIG. 2 is an end view of the structure of FIG. 1, but showing the cover in a fully open position.

The trough 12 is contained within a metal casing 15 (sometimes referred to as a "shell", and shown in broken lines in FIGS. 1 and 2) and there is normally insulating refractory material (not shown) packed between the metal casing and the trough to reduce heat loss from the trough and to lower the temperature of the casing. The ends of the structure are provided with end plates 16 which are larger than the casing 15. Metal top plates 17 are firmly bolted to the casing 15 by means of bolts 18. The metal casing 15 may itself be held within longitudinally-spaced U-shaped axial metal ribs or cradles (not shown) that raise the casing 15 and the end plates 16 from the underlying floor 56 (see FIG. 6) or other support.

The channel 14 has an open upper end 19 (FIG. 2) extending along its length and the open upper end is closed by a movable cover 20 having an outer metal shell 21 and an internal layer 22 of insulating material. The cover 20 also has an upstanding external handle 24, forming a manually-graspable region of the cover, adjacent to one edge of the cover (the edge closest to a front side 26 of the structure before which the operator stands when operating the cover), although in other exemplary embodiments, the cover may be provided with other kinds of graspable regions for opening the cover, e.g. an overhanging metal lip or channel, a groove in a side region of the cover, a handle in the side region, an outwardly extending post, or the like, or may be left without such a graspable region, particularly if a powered device is provided to open and close the cover (as described later). The cover has an underside 25 that directly faces the contents of the trough when the cover is in the closed position, and may therefore be heated to an elevated temperature by proximity with the molten metal contents of the trough (not shown). Additionally, the underside 25 may be provided with trough heater(s), e.g. heaters 66 of the kind shown in FIG. 12 or as described in U.S. Pat. No. 4,531,717 to Hebrant mentioned above (the disclosure of which patent is incorporated herein by this reference), and may be elevated in temperature additionally by the operation of such heater(s).

Figure 3:
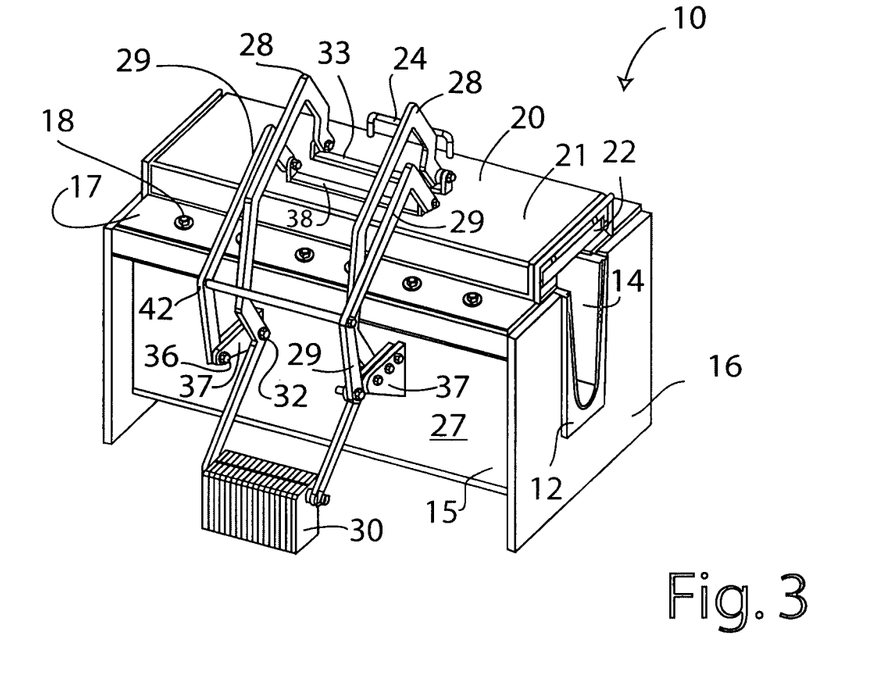
FIG. 3 is a perspective view of the structure of FIG. 1, i.e. with the cover closed.
Figure 4:
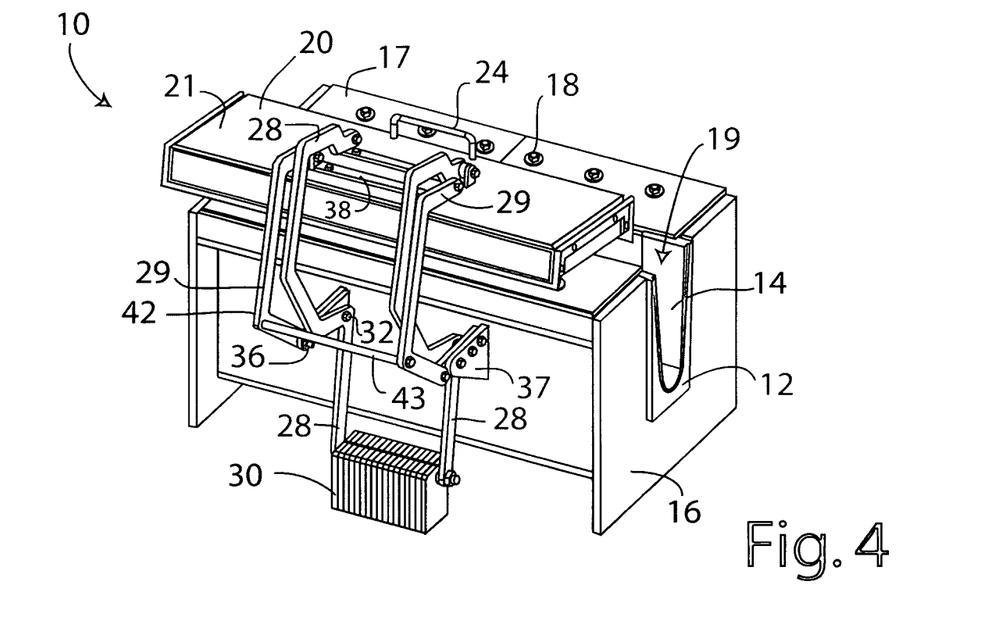
FIG. 4 is a perspective view of the structure of FIG. 2, i.e. with the cover open.

The cover 20 is not attached to the top plates 17 of the structure, but is pivotally attached by a system of four elongated arms to an upright side wall 27 of the metal casing 15 (see FIGS. 3 and 4), which is the side wall opposite to the front side 26 of the structure before which the operator stands during opening or closing of the cover. The four arms are of two kinds, namely lifting arms 28 and rotation control arms 29. These allow the cover 20 to be moved from a closed position covering the channel 14, as shown in FIGS. 1 and 3, to an open position remote from the channel, as shown in FIGS. 2 and 4. During the movement of the cover 20 from the closed position to the open position, and vice versa, the underside 25 of the cover is directed away from an operator 55 (see FIGS. 5 through 8) positioned at the front side of the structure. The operator is therefore not directly exposed to the hot underside 25 when moving the cover.

Each of the lifting arms 28 is elongated and is pivotally attached at one end to the cover 20 and at the other end to a counterweight 30. Between the two ends, the arms each have an attachment point 32 that pivotally attaches the arms to a rigid support 37 fixed to the upright side wall 27 of the metal casing 15. The cover 20 has a bracket 33 (best seen in FIG. 3) securely attached to the outer metal shell 21. The bracket 33 has upstanding ends 34 that act as journals for pivotal attachment of the ends of the arms 28 by means of bolts 35 that extend through holes in the upstanding ends of the brackets and the adjacent ends of the arms.

Each of the rotation control arms 29 is also elongated and has opposite ends. One end of each arm is pivotally attached to the cover 20 and the other end is pivotally attached to the rigid support 37 via a pivot point 36 attached to the upright side wall 27 of the metal casing 15. The attachment of arms 29 to the cover 20 is via a bracket 38 firmly attached to the outer metal shell 21 of the cover. The bracket 38 has upstanding ends 39 which act as journals for bolts 40 passing through holes in the upstanding ends 39 and the upper ends of the arms 29, thereby permitting rotation of the ends of the arms relative to the cover 20. The arms 29 have elbows 42 that are connected together by a tie-rod 43 that provides the arms with additional lateral stability.

As noted, there are two lifting arms 28 and two rotation-control arms 29 in the illustrated exemplary embodiment. Each arm of a pair is separated from the other in the longitudinal direction (direction along the trough) of the cover, although each of the lifting arms 28 is positioned directly adjacent to one of the rotation-control arms 29, as shown. This arrangement reduces end-to-end tilting and swinging of the cover both because of the longitudinally spaced attachment points of the arms and the cover, and because of lateral support of the lifting arms by the rotation-control arms, and vice versa.

Figure 7:
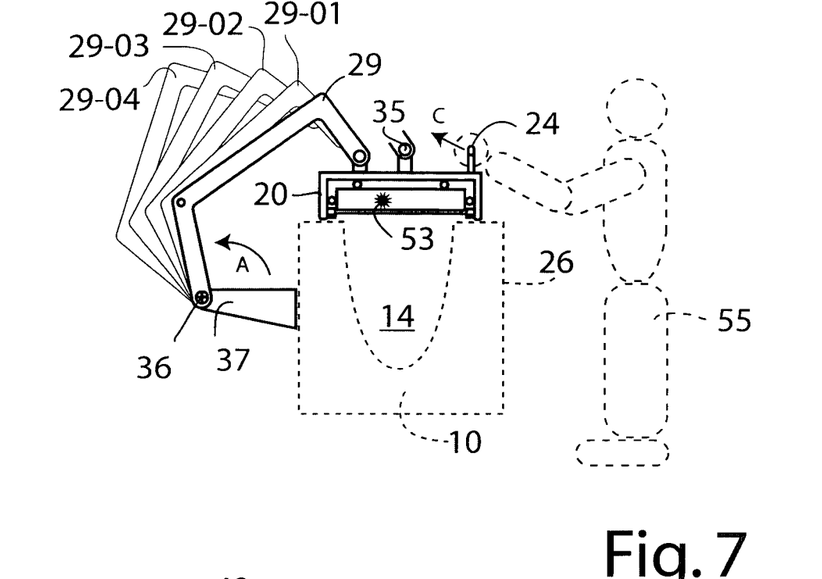
FIG. 7 is a schematic diagram showing movements of the rotation control arms of the embodiment of FIG. 1 from the closed position (the lifting arms have been largely omitted for clarity)
Figure 8:
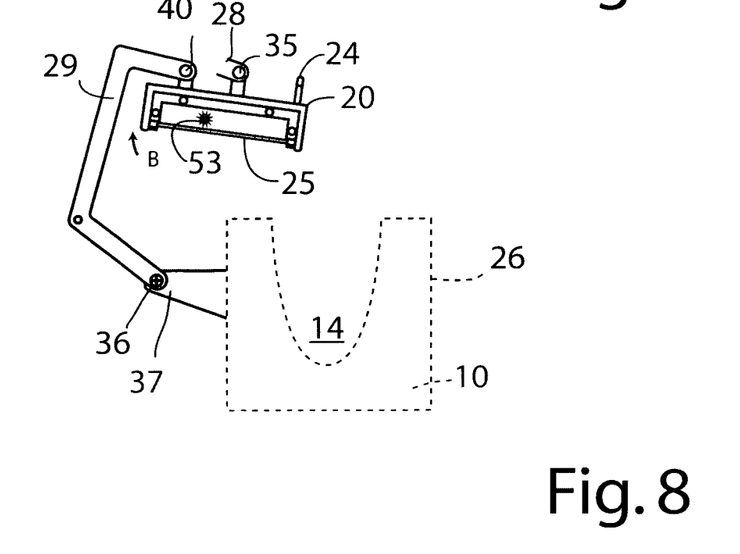
FIG. 8 is a schematic diagram showing the rotation-control arms of the embodiment of FIG. 1 in the fully open position (again the lifting arms have been largely omitted)

The arms 28 and 29 provide lifting and rotational control of the cover 20 and constrain the cover to move in a particular path and with a preferred tilt. The way in which the lifting arms 28 operate in this regard is illustrated schematically in FIGS. 5 and 6, and the way in which the rotation-control arms 29 operate is shown in FIGS. 7 and 8. It should be kept in mind that the arms 28 and 29 are used together in the illustrated embodiments, although, for reasons of clarity, the lifting arms 28 are shown in isolation in FIGS. 5 and 6, and the rotation control arms 29 are shown largely in isolation in FIGS. 7 and 8.

Figure 5:
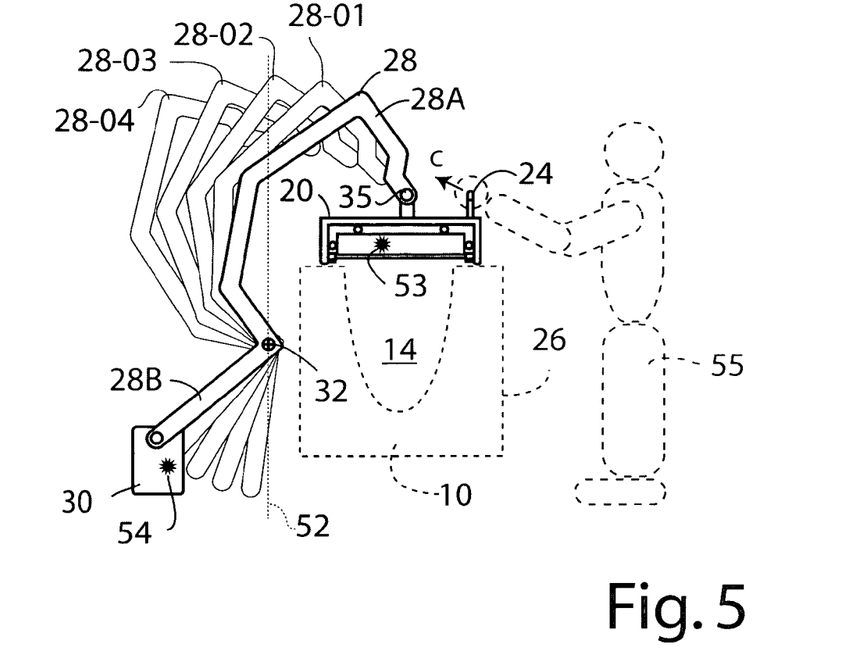
FIG. 5 is a schematic diagram showing movements of the lifting arms of the embodiment of FIG. 1 from the closed position (the rotation control arms have been omitted from this drawing for clarity and intermediate positions are shown in phantom)
Figure 6:
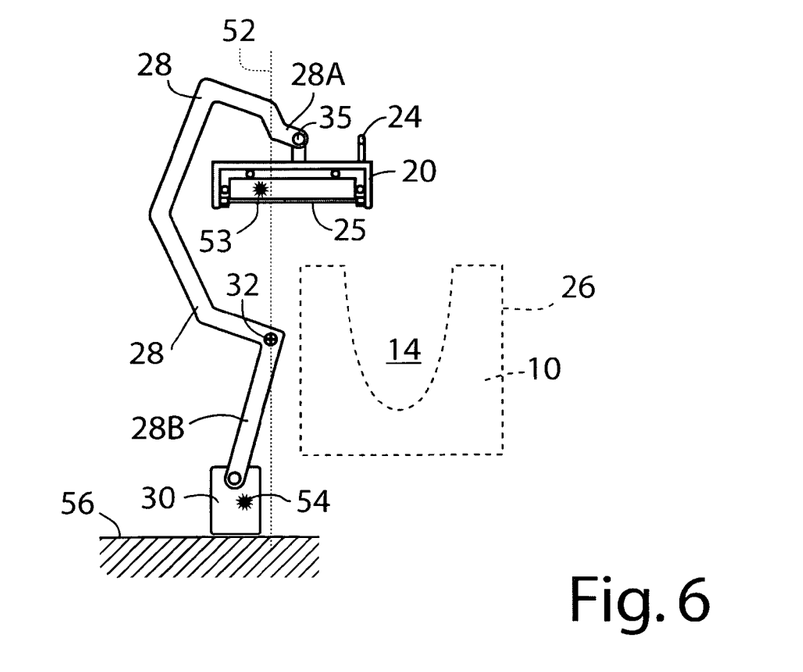
FIG. 6 is a schematic diagram showing the lifting arms of the embodiment of FIG. 1 in the fully open position (again the rotation control arms have been omitted and the cover is shown in a horizontal position)

Referring to FIGS. 5 and 6, it will be seen that each arm 28 has ends 28A and 28B and intermediate pivot points 32 firmly attached to the structure 10 (via bracket 37, not shown in these figures). FIG. 5 shows the cover in the closed position, but illustrates in shadow lines progressive intermediate positions 28-01 to 28-04 of the lifting arm 28 as an operator lifts the cover using handle 24. The fully open position of the cover and the arms is shown in FIG. 6. The line 52 in FIGS. 5 and 6 indicates a vertical plane at the top-dead-center of the pivot point 32. While the center of gravity, shown by point 53, of the combination of the cover 20 and the parts of the lifting arms 28A on the cover side of the pivot point 32 remains to the right of the line 52 (the side of the operator 55), the weight of the cover tends to pull the cover to the closed position. This weight is partially counterbalanced by the combined weight of the counterweight 30 and the parts 28B of the lifting arms 28 on the counterweight side of the pivot point 32, which act through a center of gravity shown by point 54. The counterbalancing effect is based on weight times distance from the pivot point 32, and it is made such that a relatively small force is required from the operator 55 to move the cover 20, which otherwise remains in the closed position. The force required to raise the cover is made much less than the true weight of the cover because of the effect of the counterweight 30. Until the cover is opened to such an extent that the center of gravity 53 of the cover 20 lies to the left of the line 52, there is a downward force on the cover 20 urging it to the closed position of FIG. 5. However, when the center of gravity 53 moves to the left of the line 52, both the weight of the cover 20 (and upper arm parts 28A) and the weight of the counterweight 30 (and lower arm parts 28B) urge the cover to the fully open position of FIG. 6 where the cover remains until the operator closes the cover again. Means are provided to prevent the lifting arms 28 from pivoting beyond the fully open position of FIG. 6. Such means may involve contact of the counterweight 30 with the ground 56, as shown, contact of the cover 20 with the arms 28, or any other stop means. The lifting arms 28 are shaped as shown to provide the desired lever action around the pivot 32 and to accommodate the movement of the cover. This means that the upper parts 28A are generally C-shaped in order to accommodate the cover, and the lower parts 28B are straight but arranged at a sharp angle to the upper parts around the pivot 32.

In FIGS. 5 and 6, the cover 20 is shown in a horizontal position, which might be expected if its rotation were not controlled by rotation control arms 29. This may give the impression that, if no such rotation-control arms 29 were provided, the underside 25 of the cover would always face directly down and would therefore not be directed towards the operator 55. However, this would not be the case because the operator would exert a lifting force on the cover via the handle 24, and, if not for the rotation-control arms 29, this would pivot the cover around the bolt 35 and expose the operator to the hot underside 25.

FIGS. 7 and 8 show how the rotation-control arms 29 prevent such exposure. FIG. 7 shows the cover 20 in the closed position, as well as in intermediate positions 29-01 to 29-04 shown in shadow lines, and FIG. 8 shows the cover 20 in the fully open position. As can be seen, the arms 29 rotate around pivot point 36, in the direction of the arrow A in FIG. 7, from the closed position of FIG. 7 to the open position of FIG. 8. This rotation constrains the cover 20 to tilt in the direction of arrow B in FIG. 8 away from the operator 55. The way in which the cover 20 is constrained to tilt in this manner depends on (1) the relative lengths of the arms 28 and 29; (2) the distance between the attachment points of the arms on the cover 20; (3) the horizontal and/or vertical distance between the pivot points 32 and 36 on the structure 10; and (4) the vertical distance between the pivotal attachments at the cover 20 (bolts 35 and 40) and the top of the structure 10. If the angle of rotation is to be adjusted after installation of the cover, it is simplest to substitute arms 28 or 29 with alternative arms of different lengths than those originally present.

It is also to be noted that the pivot points 32 and 36 of the arms are positioned at a vertical level below that of the top of the structure 10, and hence below the cover 20. This has the effect that the cover 20 is constrained to move in a flat arc from the closed position to the open position, and vice versa. Thus, rather than having to lift the cover 20 vertically upwards from the closed position, the operator 55 pushes the cover mostly horizontally away from the structure 10 as shown by the arrows C in FIGS. 5 and 7. Conversely, the operator pulls the cover generally horizontally when moving the cover from the open position to the closed position. A horizontal force originating from the operator has quite a long moment arm measured down to the pivot point of the lifting arms 28, thereby requiring a much lower force from the operator directed in a more favorable direction. Such a push/pull motion can be delivered from the operator's core muscles of the torso and legs, instead of requiring a lifting motion that involves upper body and arm strength. The direction of the required force is thus less taxing on all operators and makes it easy to operate the cover for those of smaller stature or lesser arm strength. Such motion is, of course, further facilitated by the contribution of the counterweight 30.

As noted earlier, the lifting arms 28 are attached to the cover via bracket 33 and is the rotation control arms 29 are attached to the cover via bracket 39. Such brackets allow the arms to be spaced from each other by desirable distances. The brackets are preferably positioned such that the center of gravity of the cover is positioned in the longitudinal direction of the cover between the ends of the pair of arms 28 as well as between the ends of the pair of arms 29. Moreover, in the transverse direction of the cover, as shown in FIGS. 7 and 8, the center of gravity 53 of the cover is also preferably positioned between the two brackets 33 and 39 so that the cover is supported stably.

The amount of tilt of the cover 20 should always be such that the operator 55 is protected from direct exposure to heat from the underside 25 of the cover. This normally means that the angle of tilt from the horizontal should preferably be no more than about 25° towards the operator (because a small tilt to this maximum towards the operator will not expose the operator to significant heat as the underside 25 still faces the structure rather than the operator), and is more preferably held horizontal or ideally tilted away from the operator by any angle, e.g. up to about 30° as shown in the drawings.

Figure 9:
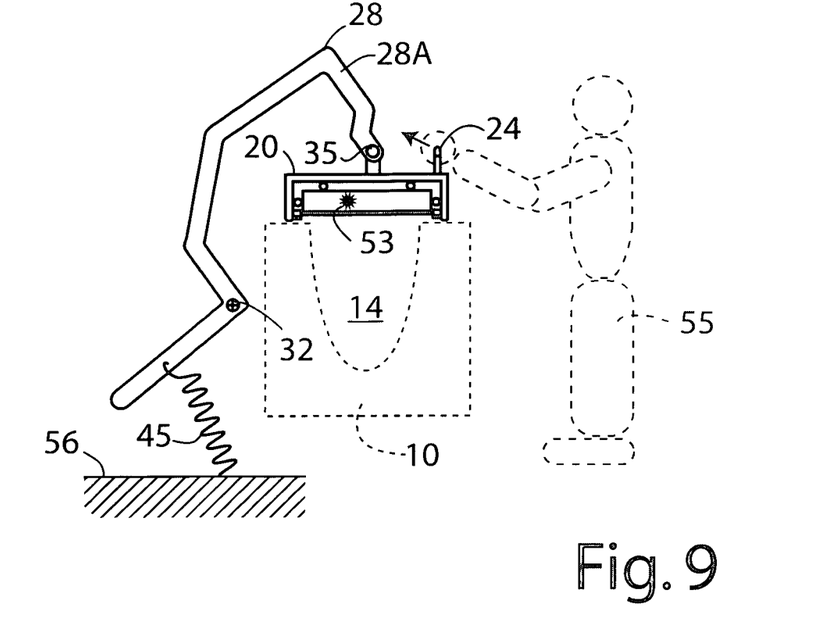
FIG. 9 is a view similar to FIG. 5 but showing an alternative exemplary embodiment having a spring rather than a counterweight acting to counterbalance the weight of the cover (rotation control arms have again been omitted for clarity)

Although the exemplary embodiments discussed above employ a counterweight 30 to reduce the force required to move the cover 20, other means may be used for the same purpose, e.g. springs. A suitable arrangement employing a spring 45 is shown in FIG. 9, but other designs would also be possible.

Figure 10:
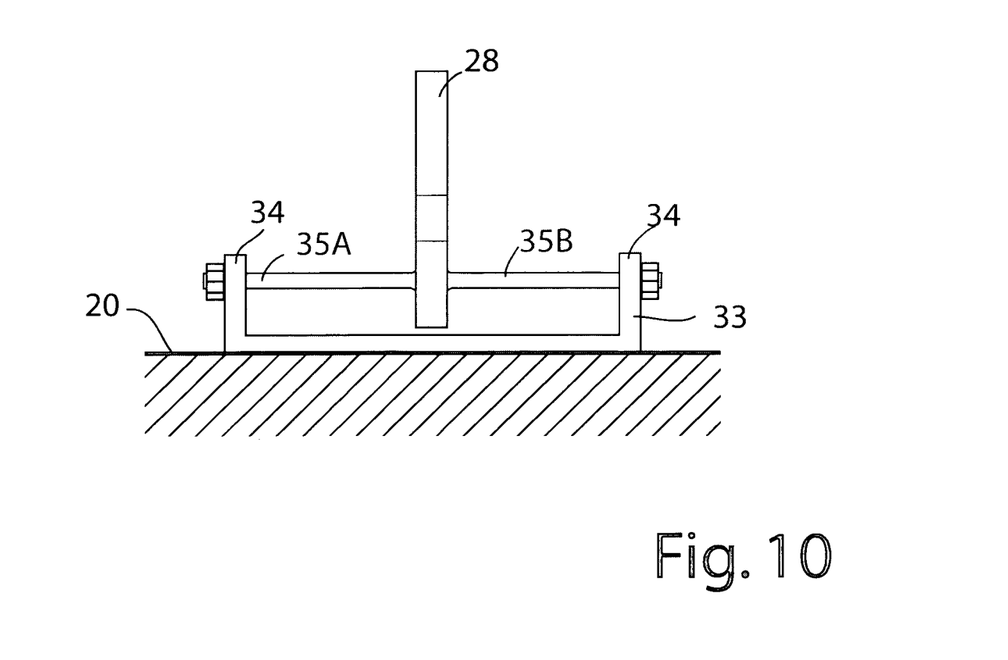
FIG. 10 is an enlarged side view of a stable means of attachment of a lifting arm with the cover (shown partly in cross-section) allowing a single such arm to be used instead of a pair, this view is from the operator side of the cover.

Moreover, although pairs of each kind of the arms 28 and 29 have been illustrated, alternative embodiments may have just one arm 28 and one arm 29. Such an embodiment is less preferred, but may be effective when the cover 20 is quite small, or when the journals at the pivot points are strong and prevent significant play. For example, FIG. 10 shows how a single arm 28 may have sidebars 35A and 35B that pivotally attach to the upstanding ends of the bracket 33, thereby maintaining spaced journal points while employing just a single lifting arm 28. The same kind of attachment may be used for a single rotation control arm 29. On the other hand, if the cover is particularly long, more than two of each of the spaced arms 28 and 29 may be provided to ensure that the cover is stably supported. A suitable number of attachment brackets may be provided for pivotal attachment of all of the arms. Of course, for really long trough lengths, more than one cover may be provided, each with a supporting structure as disclosed above.

It is also to be noted that, while the "over-center" arrangement of FIGS. 5 and 6 is particularly preferred, other embodiments may be provided in which the counterweight exactly balances the cover 20 so that the cover remains in any position when released, i.e. the open position, the closed position or any position therebetween, or in which the pivot points generate significant friction so that any downward force on the cover (when released) fails to exceed the friction and move the cover from the open position to the closed position, or allows the cover to fall slowly.

Figure 11:
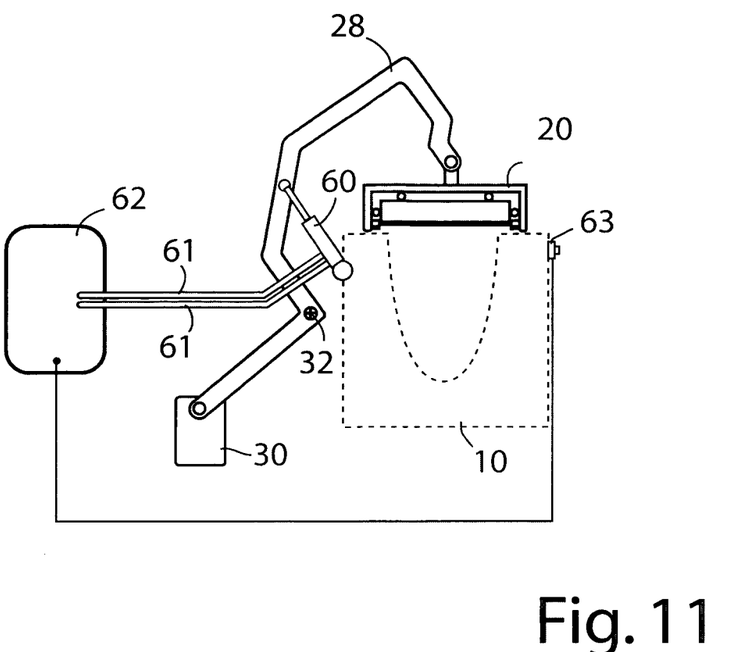
FIG. 11 is a view similar to FIG. 5, but showing a device for moving the cover from an open position to a closed position, and vice versa (again rotation control arms have been omitted for clarity)

As briefly alluded to above, a powered device may be provided to move the cover between the open and closed positions, so that the operator may avoid direct contact with the cover. Such an arrangement is shown in FIG. 11 where a pneumatic or hydraulic piston and cylinder combination 60 acts between the structure 10 and the lifting arms 28 upon flow of pneumatic or hydraulic fluid through lines 61 from a motor 62 under control of the operator via a pushbutton or lever 63. While such a device may be made powerful enough not to need assistance from a counterweight 30 or springs when moving the cover 20, such a counterweight or springs are still preferably provided so that lower power equipment may be employed and smoother operation obtained.

Figure 12:
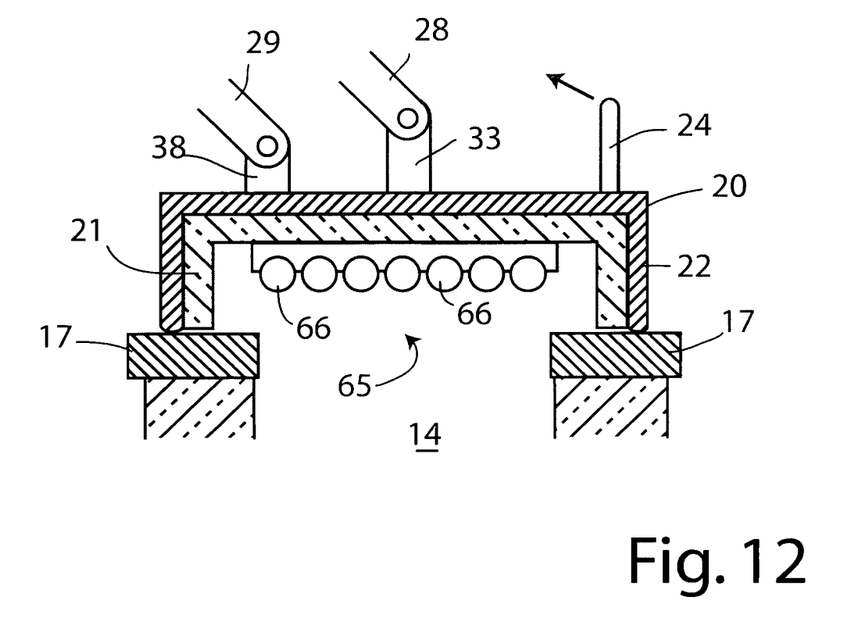
FIG. 12 is an enlarged sectional view of a cover, towards one end thereof, the cover being suitable for use in the exemplary embodiments illustrating a heating device provided at the underside of the cover.

FIG. 12 is a sketch illustrating a cover 20 provided with a trough heater 65 at the underside. The cover has an outer metal shell 21 and a layer of insulation 22 to which the heater is attached. The heater includes numerous elongated electrical heating elements 66 for directing radiant heat into the channel 14 of the structure. Covers of this kind benefit particularly from the controlled and counterbalanced systems as shown because such heaters tend to be rather delicate and can easily be damaged if the cover is closed too forcefully or quickly. The illustrated embodiments make it possible to open and close the cover very smoothly and relatively slowly, and release of the cover does not cause the cover to fall rapidly onto the structure. The heaters 65 may be operated electrically, as indicated, or alternatively by combustion of gas or liquid fuel.

In the above embodiments, the structure 10 is in the form of an elongated molten metal trough of the kind used in molten metal distribution systems used for conveying molten metal from one location (e.g. a metal melting furnace) to another location (e.g. a casting mold or casting table). However, according to other exemplary embodiments, other kinds of molten metal containment vessels may employed, e.g. structures used as in-line ceramic filters (e.g. troughs containing ceramic foam filters) for filtering particulates out of a molten metal stream as it passes through the structure. Examples of such structures are disclosed in U.S. Pat. No. 5,673,902 which issued to Aubrey et al. on Oct. 7, 1997, and PCT publication no. WO 2006/110974 A1 published on Oct. 26, 2006. The disclosures of the aforesaid U.S. patent and PCT publication are specifically incorporated herein by this reference.

In another exemplary embodiment, the structure may act as a container in which molten metal is degassed, e.g. as in a so-called "Alcan compact metal degasser" as disclosed in PCT patent publication WO 95/21273 published on Aug. 10, 1995 (the disclosure of which is incorporated herein by reference). The degassing operation removes hydrogen and other impurities from a molten metal stream as it travels from a furnace to a casting table. Such a structure includes a trough-like internal volume for molten metal containment into which rotatable degasser impellers project from above. In the exemplary embodiments, the impellers may be incorporated into the cover with the arms arranged to provide clearance as the cover and impellers are moved between the open and closed positions. Such structures may be used for batch processing, or may be part of a metal distribution system attached to metal conveying vessels. The structure may alternatively be designed as a refractory ceramic crucible for containing large bodies of molten metal for transport from one location to another. All such alternative structures may be used with the exemplary embodiments of the invention provided they benefit from the provision of a movable cover.

The invention claimed is:

1. A molten metal containment structure, comprising:
a vessel having an internal volume for containing molten metal and an open upper end; and
a cover for the vessel having an underside facing said internal volume, said cover being movable between a closed position, covering said open upper end of the vessel with the underside of the cover, and an open position in which said cover is remote from said open upper end of the vessel to allow access to the internal volume from one side of the structure;
wherein said cover is attached to at least one elongated lifting arm and at least one elongated rotation control arm, wherein the at least one elongated lifting arm and the at least one elongated rotation control arm are attached to the vessel;
wherein the at least one lifting arm is configured to rotate along a first path to guide the cover from said closed position to said open position, and vice versa, and
wherein the at least one rotation control arm is configured to rotate along a second path that is substantially parallel to the first path to control pivoting of the cover from a generally horizontal position during movement from said open position to said closed position, and vice versa, to prevent exposure of said underside of the cover to a person positioned adjacent to the structure at said one side, and
wherein said at least one lifting arm or said at least one rotation control arm provides a force that at least partially counterbalances a weight of the cover.

2. The structure of claim 1, wherein said at least one lifting arm has a counterweight attached thereto providing said force.

3. The structure of claim 1, wherein said at least one lifting arm has a spring attached thereto providing said force.

4. The structure of claim 1, wherein said at least one lifting arm is pivotally attached to said vessel at a vertical height below a vertical height of said open upper end of the vessel.

5. The structure of claim 1, wherein said underside of the cover is provided with a heater for heating said internal volume when said cover is in the closed position.

6. The structure of claim 1, wherein said underside of the cover is provided solely with a layer of refractory insulating material facing said internal volume.

7. The structure of claim 1, having at least two lifting arms and at least two rotation control arms, said lifting arms being mutually spaced apart along the cover, and said rotation control arms being mutually spaced apart along the cover.

8. The structure of claim 7, wherein each lifting arm is positioned immediately adjacent to a rotation control arm, and vice versa, whereby said arms provide mutual physical support during movement of the cover.

9. The structure of claim 1, wherein said at least one lifting arm has a C-shaped portion to accommodate movement of the cover from the closed position to the open position.

10. The structure of claim 1, wherein said at least one rotation control arm has a C-shaped portion to accommodate movement of the cover from the closed position to the open position.

11. The structure of claim 1, wherein said cover is provided with a manually graspable region adjacent to said one side.

12. The structure of claim 11, wherein the manually graspable region is a handle attached to the cover.

13. The structure of claim 1, including a powered device for moving said cover from said closed position to said open position, and vice versa.

14. The structure of claim 13, wherein said device includes a piston and cylinder acting between said at least one lifting arm and said casing.

15. The structure of claim 13, wherein said device includes a remotely operable control, said control being operable to control movement of said cover.

16. The structure of claim 1, wherein said vessel is made of a refractory material that is resistant to attack by molten metal.

17. The structure of claim 1, wherein said at least one rotation control arm prevents said cover from rotating at said underside from the generally horizontal position by more than approximately 25° towards said one side.

18. The structure of claim 1, wherein said at least one rotation control arm causes said cover to rotate at said underside from the generally horizontal position in a direction facing away from said one side.

19. The structure of claim 1, wherein said vessel is an elongated trough for conveying molten metal, said trough having an inlet for molten metal at one end of the structure and an outlet for molten metal at an opposite end of the structure.

20. The structure of claim 1, wherein said vessel includes an outer metal casing.

21. The structure of claim 20, wherein said arms are pivotally attached to a sidewall of said metal casing opposite to said one side of the structure.

22. The structure of claim 1, wherein a rotation axis of said at least one rotation control arm is substantially parallel to a rotation axis of said at least one lifting arm.

23. A molten metal containment structure, comprising:
a vessel having an internal volume for containing molten metal and an open upper end; and
a cover for the vessel having an underside facing said internal volume, said cover being movable between a closed position, covering said open upper end of the vessel with the underside of the cover, and an open position in which said cover is remote from said open upper end of the vessel to allow access to the internal volume from one side of the structure;
wherein said cover is attached to at least one elongated lifting arm and at least one elongated rotation control arm, the at least one lifting arm operating to guide the cover from said closed position to said open position, and vice versa, and the at least one rotation control arm operating to control pivoting of the cover during movement from said open position to said closed position, and vice versa, to prevent exposure of said underside of the cover to a person positioned adjacent to the structure at said one side, and wherein said at least one lifting arm or said at least one rotation control arm provides a force that at least partially counterbalances weight of the cover,
wherein said at least one lifting arm is attached to said vessel via a pivot having a center in a vertical plane, and wherein said cover and directly attached parts of said arms have a center of gravity that is positioned on one side of said vertical plane when in the closed position and the other side of said plane when in the open position.

24. A molten metal containment structure, comprising:
a vessel having an internal volume for containing molten metal and an open upper end; and
a cover for the vessel having an underside facing the internal volume, said cover being movable between a closed position, covering the open upper end of the vessel with the underside of the cover, and an open position in which the cover is remote from the open upper end of the vessel to allow access to the internal volume from one side of the structure;
wherein the cover is directly attached to at least one elongated lifting arm and is directly attached to at least one elongated rotation control arm and wherein the at least one elongated lifting arm and the at least one elongated rotation control arm are attached to the vessel,
wherein the at least one lifting arm is configured to guide the cover from the closed position to the open position, and vice versa, and
wherein the at least one rotation control arm is configured to rotate in conjunction with the at least one lifting arm in a way that controls pivoting of the cover during movement from the open position to the closed position, and vice versa, so as to limit exposure of the underside of the cover to a person positioned adjacent to the structure at the one side, and
wherein the at least one lifting arm or the at least one rotation control arm provides a force that at least partially counterbalances a weight of the cover.

25. The structure of claim 24, wherein said at least one lifting arm and said at least one rotation control arm are offset from one another along said cover.

26. A molten metal containment structure, comprising:
a vessel having an internal volume for containing molten metal and an open upper end; and
a cover for the vessel having an underside facing the internal volume, said cover being movable between a closed position, covering the open upper end of the vessel with the underside of the cover, and an open position in which the cover is remote from the open upper end of the vessel to allow access to the internal volume from one side of the structure;
wherein the cover is attached to at least one elongated lifting arm and at least one elongated rotation control arm and wherein the at least one elongated lifting arm and the at least one elongated rotation control arm are attached to the vessel,
wherein the at least one lifting arm is configured to guide the cover from the closed position to the open position, and vice versa, and
wherein the at least one rotation control arm is configured to rotate in conjunction with the at least one lifting arm in a way that controls pivoting of the cover during movement from the open position to the closed position, and vice versa, to prevent the cover from rotating from a generally horizontal position by more than approximately 30° so as to limit exposure of the underside of the cover to a person positioned adjacent to the structure at the one side, and
wherein the at least one lifting arm or the at least one rotation control arm provides a force that at least partially counterbalances a weight of the cover.

* * * * *